United States Patent Office

3,732,178
Patented May 8, 1973

3,732,178
VINYL CHLORIDE EMULSION POLYMER AND COPOLYMER COMPOSITIONS
Ludwig Kuhnen, Marl, Germany, assignor to Chemische Werke Huls Aktiengesellschaft, Marl, Germany
No Drawing. Continuation-in-part of application Ser. No. 790,152, Jan. 9, 1969, now Patent No. 3,627,717, and abandoned applications Ser. No. 887,395, Dec. 22, 1969, and Ser. No. 20,015, Mar. 22, 1970. This application Sept. 27, 1971, Ser. No. 184,209
Claims priority, application Germany, Jan. 20, 1968, P 17 20 430.7; Apr. 18, 1968, P 17 70 223.7; Jan. 14, 1969, P 19 10 149.3; Apr. 11, 1969, P 19 18 414.6
The portion of the term of the patent subsequent to Dec. 14, 1988, has been disclaimed
Int. Cl. C08f *3/30, 29/18, 45/54*
U.S. Cl. 260—23 EM   11 Claims

ABSTRACT OF THE DISCLOSURE

Vinyl chloride polymer and copolymer compositions are prepared by emulsion polymerization of vinyl chloride in the presence of sodium salt of α-sulfo-fatty acids. The compositions and methods are improved by emulsifying the vinyl chloride in the presence of sodium salts of α-sulfo-fatty acids having 12 to 24, and preferably 12 to 18 carbon atoms, wherein the sodium salts of the α-sulfo-fatty acid have a concentration of 0.6 to 4.0, and preferably 0.8 to 3.0 percent by weight based on the monomers and the polymerization is performed at a pH value of 2 to 11.

CROSS-REFERENCE TO RELATED APPLICATIONS

The present application is a continuation-in-part of copending U.S. patent applications: Ser. No. 790,152 filed Jan. 9, 1969 and now U.S. Pat. No. 3,627,717; Ser. No. 887,395, filed Dec. 22, 1969; and now abandoned and Ser. No. 20,015 filed Mar. 22, 1970, and now abandoned.

According to application Ser. No. 790,152 now U.S. Pat. 3,627,717 solid polymers and copolymers of vinyl chloride having improved heat-stabilizability with barium-cadmium stabilizers are prepared by emulsifying a vinyl chloride monomer or a mixture of a vinyl chloride monomer and unsaturated polymerizable compounds with disodium salts of α-sulfo-fatty acids having 12 to 24 carbon atoms and a concentration of 0.6 to 4.0 percent by weight based on the monomer and the unsaturated polymerizable compounds. The polymerization with the disodium salts is performed at a pH of 6 to 11 and the dispersion of polymers and copolymers is mixed with 0.02 to 2.0 percent by weight of alkaline agent based on the polymers and copolymers. Specific Examples 6a, 6b, 7a, 7b, 8a, 8b, 9a, 9b, 10a, 10b, 11a, 11b, 12a, 12b, 13, 16, 18, 19, 23, 25, 26, 29 and 31 make use of the disodium salts. These examples are incorporated herein.

Vinyl chloride polymer compositions are prepared according to application Ser. No. 887,395 by emulsion polymerization of vinyl chloride monomer in the presence of monosodium salts of α-sulfo-fatty acids having 12 to 24, and preferably 12 to 18 carbon atoms, wherein the monosodium salts have a concentration of 0.6 to 4.0 and preferably 0.8 to 3.0 percent by weight, based on the monomer. The polymerization with the monosodium salts is performed at a pH of 2 to 5 and the dispersion of polymers is mixed with 0.1 to 0.8 percent by weight of alkaline agents before drying.

Copolymer compositions of vinyl chloride are prepared according to application Ser. No. 20,015 by emulsion polymerization of vinyl chloride and comonomers in the presence of monosodium salts of α-sulfo-fatty acids having 12 to 24, and preferably 12 to 18 carbon atoms wherein the monosodium salts have a concentration of 0.6 to 4.0 and preferably 0.8 to 3.0 percent based on the copolymer content. The polymerization with the monosodium salts is performed at a pH of 2 to 5 and prior to the separation of the copolymer 0.4 to 0.6 percent by weight of alkaline agents, based on the copolymer content, are added.

BACKGROUND OF THE INVENTION

The field of the invention is synthetic resin interpolymers of polymerized unsaturated compounds and polymerized unsaturated compounds from halogenated hydrocarbons comprising acyclic vinyl halides.

The state of the prior art may be ascertained by reference to the "Encyclopedia of Polymer Science and Technology," vol. 5, under the section "Emulsion Polymerization," pages 801–859, and by reference to the Kirk-Othmer "Encyclopedia of Chemical Technology," vol. 14, (1955), under the section "Vinyl Chloride," pages 723–735, and particularly pages 727–730, and vol. 7, 2nd ed. (1965), under the section entitled "Drying," pages 360–368. Other prior art references include the 1966 Stabilizer Handbook of German Advance Production GmbH, U.S. Pat. 2,140,048 of Fikentscher et al., and German Patents 654,989 and 842,119.

The K-value used in evaluating the compositions of the present invention is disclosed by Houben-Weyl, Makromolekulare Stoffe I, G. The Thieme Verlag, Stuttgart, 1901, page 83.

It is known that polyvinyl chloride and vinyl chloride-copolymers can be produced in aqueous dispersions by the method of suspension polymerization or emulsion polymerization. The suspension polymers have, as compared with the emulsion polymers, certain advantages which, among others, relate to their improved heat stability and transparency. The emulsion polymerization, on the contrary, has the advantage of permitting the polymerization to be performed optionally either discontinuously or continuously. The emulsion polymers can also be more easily worked with and formed into paste.

Additionally, it has been found that vinyl chloride copolymers in general exhibit a lesser thermostability than the homopolymer.

For the stabilization of emulsified polyvinyl chloride, the following stabilizer classes are most frequently used:

(1) Tin-organic stabilizers;
(2) Barium-cadminum stabilizers; and
(3) Lead stabilizers.

The choice of stabilizer must, however, depend very largely on the polyvinyl chloride emulsifier that is present and on the pH at which the polymerization is controlled.

A polyvinyl chloride or copolymer emulsion which is polymerized in the presence of a sulfate group- or sulfonate group-containing emulsifier (as for example in the presence of an alkyl sulfate or secondary sulfonate), is advantageously stabilized by expensive tin-organic stabilizers. The same polymer emulsion would, on the contrary, be more poorly stabilized by the less expensive barium-cadmium- or lead-stabilizers. Also, an alkaline prestabilization in a known manner by the addition of such amounts of inorganic alkalies that the pH value of the dispersion prior to an atomization drying lies in the alkaline region, effects a further improvement of the thermal stability only in the stabilization of the above-mentioned polyvinyl chloride- or copolymer-emulsion, while the same stabilization treatment with barium-cadmium- or lead-compounds has little or no effect.

A polyvinyl chloride or copolymer, on the contrary, which is polymerized in the presence of an carboxyl group-containing emulsifier, as for example sodium laurate or sodium stearate, can be stabilized very well with lead compounds. A similar treatment with tin-organic- or barium-cadmium-stabilizers results, however, in products which, when heated, will quickly discolor and decompose. Such early occurrence of discoloration and decomposition can in no case be prevented by an additional alkaline prestabilization in a known manner with an addition of inorganic alkalies to the polyvinyl chloride dispersion prior to atomization drying process.

It can also be learned from the Stabilizer Handbook of 1966 of the German Advance Production GmbH, that alkaline prestabilized polyvinyl chloride emulsion will not lead itself to barium-cadmium stabilization.

On the basis of this determination, it can be stated that there has heretofore not been any polyvinyl chloride that can be effectively stabilized with conventional stabilizers.

It is already known that sulfonates of short-chained fatty acids can be added to adjuvants for the polymerization of vinyl chloride (German Pat. 842,119). However, by this method suspensions (of particle size 1μ) are obtained which can be processed by filtration or centrifuging so that the emulsifier will not remain in the polymer.

German Pat. 654,989 also teaches that sodium sulfopalmitate can be added as an adjuvant for the polymerization of acrylic acid derivatives, possibly in mixtures with vinyl chloride. By the method described in this patent, the resulting emulsions are, however, coagulated, and after washing with water there are obtained polymers which although of a high degree of purity, have only little thermal stability.

SUMMARY OF THE INVENTION

An object of the present invention is the production of polymers and copolymers of vinyl chloride having improved heat stability and stabilizability with thermostabilizers. These polymers and copolymers are produced by emulsion-polymerization of vinyl chloride and by copolymerization of the vinyl chloride with polymerizable unsaturated compounds in the presence of monosodium or disodium salts of α-sulfo-fatty acids at a pH of 2–11.

According to one method of carrying out the invention, the polymers and copolymers are produced by emulsion-polymerization of vinyl chloride and by copolymerization of the vinyl chloride with polymerizable unsaturated compounds at a pH of 6–11 which results from using the disodium salts of α-sulfo-fatty acids.

Another object of the present invention is to produce copolymers of vinyl chloride having improved thermal stability and stabilizability with barium-cadmium stabilizers. These vinyl chloride copolymers of improved stabilizability are achieved by conducting the polymerization at a pH of 2 to 5 as a result of employing as the emulsifier monosodium salts of α-sulfo-fatty acids containing 12 to 24, and especially those containing 12 to 18 carbon atoms. The dispersions, prior to being worked up, are mixed with 0.1 to 0.8, and preferably 0.4 to 0.6 percent by weight of alkaline agents, based on the copolymer content.

Still another object of the present invention is to produce polymers of vinyl chloride having improved thermal stability and stabilizability with barium-cadmium stabilizers. This object is achieved by conducting the polymerization at a pH of 2–5 and employing as emulsifiers monosodium salts of α-sulfo-fatty acids containing 12–24 and especially those containing 12–18 carbon atoms. Prior to separation of the polymer, the emulsion is mixed with 0.4 to 0.5 percent by weight based on the solids content of alkaline agent.

The emulsion-polymerization of polymers and copolymers of vinyl chloride is carried out at a pH of 5–6 by using a mixture of monosodium and disodium salts of α-sulfo-fatty acids, the monosodium and disodium salts being presented in a weight ratio of about 1:1.

Since thermostability is very important, it is another object of the present invention to improve the thermostability of emulsion polymers by suitable methods.

Of special significance is an improved heat stabilizability by the use of atomization during as a processing method, since the residual presence of the emulsifying agent and other additives in the polymer will necessarily have an unfavorable effect on its thermal stability.

By the term atomization drying applicant has in mind the principle of atomizing the aqueous dispersions to form a spray of droplets which mix with hot air to evaporate the water and produce the dry vinyl chloride polymers and copolymers. See Kirk-Othmer, "Encyclopedia of Chemical Technology," 2nd edition, vol. 7 (1965), under the section "Drying," pages 360–368.

DESCRIPTION OF THE PREFERRED EMBODIMENTS

According to a first embodiment of the present invention, it has been found that, unexpectedly, polymers of vinyl chloride with improved heat stabilization are produced by emulsion polymerization of vinyl chloride by adding to the emulsifiers disodium salts of α-sulfo-fatty acids with 12 to 24, preferably 12 to 18 carbon atoms in amounts of 0.6 to 4.0 percent, preferably 0.8 to 3.0 percent by weight, based on the weight of the monomer, with a resulting polymerization at a pH value between 6 and 11, and preferably between 7.0 and 10.0.

It was thereby also found that vinyl chloride polymers with improved stabilizability are produced if the pH value at the beginning of the polymerization is kept between 4 and 6, and during the polymerization is permitted to increase to 7 to 10 during the addition of alkaline reagents.

In a preferred form of this first process, the polyvinyl chloride dispersions prior to their atomization drying, are reacted with 0.02 to 2.0 percent, preferably 0.1 to 0.8 percent by weight of alkaline substances, especially alkali carbonates. The result is a surprisingly strong synergistic action of the emulsifier, the alkali and the stabilizer on the thermostability. Especially advantageous is the addition of alkaline lithium compounds, especially lithium carbonate and lithium hydroxide, to the polyvinyl chloride dispersions before their drying by atomization.

It has also been found according to this first embodiment, that copolymers of vinyl chloride with generally improved heat stability can be produced by emulsion copolymerization of vinyl chloride with polymerizable monomers where disodium salts of α-sulfo-fatty acids with 12 to 24, especially 12 to 18 carbon atoms are added in amounts of 0.6 to 4.0 percent, preferably 0.8 to 3.0 percent by weight, based on the monomers, and the polymerization performed with a pH value between about 6.0 and 11.0, preferably between about 7 and 10, depending on the disodium salt concentration, and the dispersions treated with 0.02 to 2.0 percent, preferably 0.1 to 0.8 percent by weight of alkaline substances, preferably alkali carbonates.

It is also especially advantageous to add alkaline lithium compounds, especially lithium carbonate and lithium hydroxide to the copolymer dispersion prior to its drying by atomization.

It is advisable to let the alkaline prestabilized emulsions remain standing for some time, for example, a few hours or over night, before drying.

According to a second embodiment of the present invention, it has been found that, unexpectedly, polymers of vinyl chloride with improved heat stabilization can be produced by emulsion polymerization of vinyl chloride by adding to the emulsifier monosodium salts of α-sulfo-fatty acids with 12 to 24, and preferably 12 to 18 carbon atoms in amounts of 0.6 to 4.0, and preferably 0.8 to 3.0 percent by weight, based on the weight of the monomer with a resulting polymerization at a pH value of about 2 to 5.

In this second preferred form of the present invention the polyvinyl chloride emulsion, prior to the separation of the polymer is mixed with 0.4 to 0.5 percent by weight of alkaline substances, especially alkali carbonates. The result is a surprisingly strong synergistic action of the emulsifier, the alkali and the stabilizer on the thermostability.

It is also especially advantageous to add alkaline sodium compounds, especially soda and sodium carbonate to the emulsion prior to the separation of the polymer.

According to a third embodiment of the present invention, it has been found that, unexpectedly, copolymers of vinyl chloride with improved heat stability are produced by emulsion polymerization of vinyl chloride with other monomers by adding to the emulsifiers monosodium salts of α-sulfo-fatty acids with 12 to 24, and preferably 12 to 18 carbon atoms, in amounts of 0.6 to 4.0, and preferably 0.8 to 3.0 percent by weight, based on the weight of the copolymers with a resulting polymerization at a pH value of about 2 to 5.

The dispersions of this third embodiment prior to being worked up, are mixed preferably with 0.1 to 0.8 percent by weight of alkaline agents, particularly the alkali carbonates. In this embodiment of the invention, the dispersions are preferably mixed, prior to being worked up, with 0.4 to 0.6 percent by weight of alkaline agents, based on the copolymer content.

According to this third method of operation, a strong synergistic effect of emulsifier, alkali and stabilizer on the thermal stability is observed, especially when 0.4 to 0.6 percent by weight of alkali is added. The polyvinyl chloride copolymer emulsion prepared according to the present invention is extraordinarily well stabilized by the use of barium-cadmium stabilizers and resulting compositions have excellent long term, as well as short term, stability.

While the polymers and copolymers of the present invention are preferably stabilized by means of barium-cadmium stabilizers to produce both long and short term stability, other stabilizers such as, for example, organo-tin compounds, lead compounds, calcium-zinc compounds, and purely organic stabilizers may be used.

It is also possible to stabilize with other stabilizing agents, as for example, diphenyl-thiourea or aminocrotonic acid esters, possibly in the presence of costabilizers such as epoxy-softeners, chelating agents, mold release agents and UV-absorbers. Plasticizers can also be added.

Specific examples of suitable stabilizers are: the silicate, basic sulfate, basic carbonate, and basic phosphate of lead; salts of lead, tin, barium, calcium, cadmium, strontium, sodium, and lithium of such acids as formic, oxalic, maleic, caprylic, undesylenic, lauric, stearic and ricinoleic acid; metallic salts of aromatic acids, such as basic lead phthalate; barium salts of esters of thiophosphoric acid; dibasic lead phosphite; salts of aliphatic thioacids, epoxy-stearic acids, epoxy-succinic acids; epoxydized peanut oil and soya oil; compounds of quadrivalent tin $R_nSn X_{4-n}$ where R is an organic radical bonded to the tin atom through an oxygen or sulfur atom or an acid group, such as alkoxy, mercapto and acid derivatives of dibutyltin and dioctyltin, dibutyltin dilaurate, dioctyltin dilaurate, dibutyltin maleate, tetramethyl-tetrabutyl-, tetraoctyl-mercaptides of tin, mercaptide based on dioctyltin and the ester of thioglycolic acid; esters of β-aminocrotonic and p-aminobenzoic acids; substituted hydroxybenzophenones, phenolates, monosalicylates of hydroquinone, resorcinol and catechol; phenyl-β-naphthylamine, compounds of calcium with the ethyl ester of acetoacetic acid; mercapto-silanes, such as n-butyl-tris-(thiobenzoate)-silane. Very owen mixtures of two or three individual compounds are used and permit an intensification of the effectiveness of the stabilizing action.

Another advantage is the splendid transparency of the polymer emulsions produced by this invention.

The sodium salts of α-sulfo-fatty acids which are used as emulsifiers in this invention are derived from acids having 12 to 24 carbon atoms, as for example, α-sulfo-lauric acid, α-sulfomyristic acid, α-sulfopalmitic acid, α-sulfostearic acid, α-sulfo-α-methyl-palmitic acid, α-sulfo-α-methylstearic acid, α-sulfolignoceric acid, α-sulfoarachidic acid, -sulfobenhenic acid, and mixtures thereof.

Specific examples of the disodium salts of α-sulfo-fatty acids useful in the first embodiment are: the disodium salt of α-sulfolauric acid, disodium salt of α-sulfomyristic acid, disodium salt of α-sulfopalmitic acid, disodium salt of α-sulfostearic acid, disodium salt of α-sulfo-fatty acid with 12 to 18 carbon atoms (approximate chain distribution 52 percent $C_{12}$, 18 percent $C_{16}$, 20 percent $C_{18}$) the disodium salt of α-sulfo-fatty acid with 16 to 18 carbon atoms (approximate chain distribution 48 percent $C_{16}$, 52 percent $C_{18}$).

Specific examples of the monosodium salts of α-sulfo-fatty acids useful in the second and third embodiments are: monosodium salt of α-sulfo-lauric acid, monosodium salt of α-sulfomyristic acid, monosodium salt of α-sulfo-palmitic acid, and the monosodium salt of α-sulfo-$C_{16}$–$C_{18}$-fatty acid (a mixture of about 48 percent by weight of α-sulfopalmitic acid, 52 percent by weight of α-sulfo-stearic acid).

The usual radical initiators are used, such as $K_2S_2O_8$, $(NH_4)_2S_2O_8$, $H_2O_2$ and $K_2S_2O_5$.

The polymerization temperatures are kept within the temperature range used in the emulsion polymerization of vinyl chloride.

The polymerization can, if desired, be performed in a single step, or if a higher solids content is desired, then it is performed advantageously in two stages or continuously.

As alkaline substances with which the polyvinyl chloride dispersions are treated before their processing, use can be made, for example, of alkali hydroxide such as KOH, NaOH and LiOH, and also of alkali salts of weak acids, for example alkali carbonates such as soda, $Li_2CO_3$, $Na_2CO_3$ and $K_2CO_3$. In most cases the alkaline substances are added to the polymer or copolymer dispersions in an aqueous solution, such as a 2 percent soda solution. Alkaline substances which are only sparingly soluble in water are applied in aqueous suspension.

The processing is carried out by spray drying or by any other suitable method by which the emulsifier and the additives remain in the polymer.

Vinyl monomers suitable for producing the vinyl chloride copolymers of the third embodiment include vinyl esters having 4 to 5 carbon atoms, such as vinyl acetate and vinyl propionate, vinyl ethers having 6 to 14 carbon atoms such as vinyl isobutyl ether and vinyl lauryl ether, vinyl bromide, vinylidene chloride, fumaric acid and maleic acid esters having 5 to 20 carbon atoms such as methyl fumarate, methyl maleate, ethyl maleate, butyl maleate and octyl maleate, ethylene, propylene and isobutylene.

The proportion of vinyl chloride monomer to other vinyl monomers in the third embodiment is varied from 99 to 70 weight percent vinyl chloride monomer to 1 to 30 weight percent comonomer and preferably from 95 to 83 weight percent vinyl chloride monomer to 5 to 17 weight percent of comonomer.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

First embodiment

Specific examples of the first embodiment using disodium salts are disclosed in Examples 6a, 6b, 7a, 7b, 8a, 8b, 9a, 9b, 10a, 10b, 11a, 11b, 12a, 12b, 13, 16, 18, 19, 23, 25, 26, 29 and 31 of application Ser. No. 790,152 filed Jan. 9, 1969 and now U.S. Pat. No. 3,627,717.

Second embodiment

Example 1a.—In a 12 liter agitator-equipped autoclave with heating jacket, 3800 g. of water is mixed with 26 g. of the monosodium salt of α-sulfo-$C_{16}$–$C_{18}$-fatty acid (a mixture of about 48 percent by weight of α-sulfopalmitic acid, 52 percent by weight of α-sulfo-stearic acid) and 1.3 g. of $K_2S_2O_8$. After purging with nitrogen, 1300 g. of vinyl chloride is introduced under pressure into the evacuated autoclave. The content of the autoclave is heated, under agitation, to 53° C. and maintained at this temperature during the entire polymerization period. During the course of 8 hours, the pressure decreases to 2 atmospheres gauge, and the autoclave is cooled. The thus-obtained polyvinyl chloride dispersion exhibits a pH of 3.0 and a solids content of 24.7 percent.

Example 1b.—In a 40 liter agitator-equipped autoclave with heating jacket, 13,500 g. of water is mixed with 262 g. of the monosodium salt of α-sulfo-$C_{16}$–$C_{18}$-fatty acid (a mixture of about 58 percent by weight of α-sulfopalmitic acid, 52 percent by weight of α-sulfostearic acid), 13.1 g. of $K_2S_2O_8$, and the polyvinyl chloride dispersion of Example 1a. After purging with nitrogen, 13,100 g. of vinyl chloride is introduced under pressure into the evacuated autoclave. The content of the autoclave is heated, under agitation, to 52° C. and maintained at this temperature during the entire polymerization period. During the course of 9 hours, the pressure decreases to 2 atmospheres gauge, and the autoclave is cooled. The thus-produced polyvinyl chloride dispersion exhibits a pH of 2.9 and a solids content of 44.7 percent.

The polyvinyl chloride dispersion is separated into four portions. One portion remains without additives (lb.1). The three other portions are mixed with a 2.5 percent aqueous solution of 0.3 percent of $Na_2CO_3$ (lb.2); 0.5 percent of $Na_2CO_3$ (lb.3); and 0.7 percent of $Na_2CO_3$ (lb.-4), respectively, based on the solids content. All four polyvinyl chloride emulsions are worked up by spray drying. The K-value (viscosity) of the isolated polyvinyl chloride is 70.3 (measured as a 0.5 percent solution in cyclohexanone at 25° C.).

Example 2a.—A polyvinyl chloride emulsion is produced by the emulsion polymerization of vinyl chloride, as in Examples 1a and 1b.

The polyvinyl chloride dispersion is divided into five portions, mixed with: a 2.5 percent aqueous solution of 0.3 percent of soda (2a.1); 0.4 percent of soda (2a.2); 0.5 percent of soda (2a.3); 0.6 percent of soda (2a.4); and 0.7 percent of soda (2a.5), respectively, based on the solids content. All five emulsions are worked up by means of spray drying thereafter. The K-value of the isolated polyvinyl chloride is 70.5 (measured as a 0.5 percent solution of cyclohexanone at 25° C.).

Example 3a.—In a 40 liter agitator-equipped autoclave with heating jacket, 22,380 g. of water is mixed with 112.5 g. of the monosodium salt of α-sulfo-$C_{16}$–$C_{18}$-fatty acid and 7.5 g. of $K_2S_2O_8$. After purging with nitrogen, 7500 g. of vinyl chloride is introduced under pressure into the evacuated autoclave. The content of the autoclave is heated, under agitation, to 53° C. and maintained at this temperature during the entire polymerization period. During the course of 9 hours, the pressure decreases to 2 atmospheres gauge, and the autoclave is cooled. The thus-obtained polyvinyl chloride dispersion has a pH of 3.1 and a solids content of 24.5 percent.

The polyvinyl chloride emulsion is divided into 3 portions and mixed with a 2.5 percent aqueous solution of 0.3 percent of soda (3a.1); 0.5 percent of soda (3a.2); and 0.7 percent of soda (3a.3) respectively, based on the solids content. All three polyvinyl chloride dispersions are worked up by spray drying.

Third embodiment

Example 4.—In a 12 liter agitator-equipped autoclave with heating mantle, 6,280 g. of water is mixed with 32 g. of monosodium-α-sulfo-stearate and 1.6 g. of $K_2S_2O_8$. After purging with nitrogen, 160 g. of the di-n-octyl ester of maleic acid and 1,440 g. of vinyl chloride are introduced into the evacuated autoclave. The content of the autoclave is heated, under agitation, to 52° C. and maintained at this temperature during the entire polymerization period. In the course of 11 hours, the pressure decreases to 1.5 atmospheres gauge, and the autoclave is cooled.

The thus-obtained copolymer dispersion exhibits a pH of 3.1 and a solids content of 17.3 percent. The dispersion is mixed with 0.5 percent of soda (Example 4.1), based on the solids, and worked up by spray drying. The K-value of the copolymer is 63.4.

Example 5.—In a 40 liter agitated autoclave with heating mantle, 23,600 g. of water is mixed with 120 g. of the monosodium salt of α-sulfopalmitic acid and 6 g. of $K_2S_2O_8$. After purging with nitrogen, 600 g. of vinyl acetate and 5,400 g. of vinyl chloride are introduced into the evacuated autoclave. The content of the autoclave is heated, with agitation, to 52° C. and maintained at this temperature during the entire polymerization period. In the course of 13 hours, the pressure drops to 1 atmosphere gauge, and the autoclave is cooled.

The copolymer dispersion obtained exhibits a pH of 3.1 and a solids content of 20.0 percent. The dispersion is divided into three portions, mixed, respectively, with an aqueous solution of 0.3 percent of soda (Example 5.1), based on the solids; 5.3 percent of soda (Example 5.2); and 0.7 percent of soda (Example 5.3). The dispersions are worked up by atomization drying. The K-value of the copolymer is 66.4.

Example 6.—Example 5 is repeated wherein the monosodium salt of α-sulfopalmitic acid is replaced by the monosodium salt of α-sulfolauric acid in the same concentration and with comparable results.

Example 7.—Example 5 is repeated wherein the monosodium salt of α-sulfopalmitic acid is replaced by the monosodium salt of α-sulfomyristic acid in the same concentration and with comparable results.

Example 8a.—In a 12 liter agitator-equipped autoclave with heating jacket, 3800 g. of water is mixed with 27 g. of sodium salts of α-sulfo-stearic-acid (a mixture of 50 percent by weight of monosodium salt and 50 percent by weight of disodium salt) and 1.3 g. of $K_2S_2O_8$. After purging with nitrogen, 1300 g. of vinyl chloride is introduced under pressure into the evacuated autoclave. The emulsion exhibits a pH of 6.0. The content of the autoclave is heated, under agitation, to 53° C. and maintained at this temperature during the entire polymerization period. During the course of 16 hours, the pressure decreases to 2 atmospheres gauge, and the autoclave is cooled. The thus-obtained polyvinyl chloride dispersion exhibits a solids content of 24.6 percent.

Example 8b.—In a 40 liter agitator-equipped autoclave with heating jacket, 13,1000 g. of water is mixed with 239 g. of sodium salts of α-sulfo-stearic-acid (a mixture of 50 percent by weight of the monosodium salt and 50 percent by weight of the disodium salt), 11.7 g. of $K_2S_2O_8$, and the polyvinyl chloride dispersion of Example 8a. After purging with nitrogen, 13,100 g. of vinyl chloride is introduced under pressure into the evacuated autoclave. The content of the autoclave is heated, under agitation, to 52° C. and maintained at this temperature during the entire polymerization period. During the course of 13 hours, the pressure decreases to 2 atmospheres gauge, and the autoclave is cooled. The thus-produced polyvinyl chloride dispersion exhibits a pH of 5.1 and a solids content of 43.0 percent.

The polyvinyl chloride dispersion is separated into four portions. One portion remains without additives (lb.1). The three other portions are mixed with a 2.5 percent aqueous solution of 0.3 percent of $Na_2CO_3$ (1b.2); 0.5 percent of $Na_2CO_3$ (1b.3); and 0.7 percent of $Na_2CO_3$ (1b.4), respectively, based on the solids content. All four polyvinyl chloride emulsions are worked up by spray drying. The K-value (viscosity) of the isolated polyvinyl chloride is 69.8 (measured as a 0.5 percent solution in cyclohexanone at 25° C.).

I claim:

1. Solid polymers and copolymers of vinyl chloride having improved heat-stabilizability with barium-cadmium stabilizers, prepared by emulsifying a material selected from the group consisting of vinyl chloride monomer and a mixture of vinyl chloride monomer and unsaturated polymerizable compounds with sodium salts of α-sulfo-fatty acids having 12 to 24 carbon atoms and a concentration of 0.6 to 4.0 percent by weight based on said material to produce a dispersion, performing the polymerization at a pH of 2 to 11 to produce polymers and copolymers, mixing said dispersion with 0.02 to 2.0 percent by weight of alkaline agent based on said polymers and copolymers, said alkaline agent selected from the group consisting of alkali carbonates and alkali hydroxides, and drying said dispersion by atomization to produce said solid polymers and copolymers.

2. Solid copolymers of vinyl chloride having improved heat stability with barium-cadmium stabilizers, prepared by emulsifying a mixture of vinyl choride moonmer and other vinyl comonomers with monosodium salts of α-sulfo-fatty acids having 12 to 24 carbon atoms and a concentration of 0.6 to 4.0 percent by weight based on said monomers to produce a dispersion, performing the polymerization at a pH of 2 to 5 to produce copolymers, mixing said dispersion with 0.1 to 0.8 percent by weight of alkaline agent based on said copolymers, said alkaline agent selected from the group consisting of alkali carbonates and alkali hydroxides, and drying said dispersion by atomization to produce said solid copolymers.

3. The product of claim 2, wherein the concentration of alkaline agents is 0.4 to 0.6 percent by weight based on the solids content and said monosodium salts of α-sulfo-fatty acids are 0.8 to 3.0 percent by weight and have 12 to 18 carbon atoms.

4. The product of claim 2, wherein said comonomers are selected from the group consisting of vinyl esters having 4 to 5 carbon atoms, vinyl ethers having 6 to 14 carbon atoms, vinyl bromide, vinylidene chloride, methylfumarate, maleic acid esters having 5 to 20 carbon atoms, ethylene, propylene and isobutylene.

5. The product of claim 4, wherein the proportion of vinyl chloride monomer to other vinyl comonomers is varied from about 99 to 70 percent weight vinyl chloride monomer to about 1 to 30 weight percent comonomer.

6. The product of claim 2, wherein said α-sulfo-fatty acids are selected from the group consisting of α-sulfolauric acid, α-sulfomyristic acid, α-sulfopalmitic acid, α-sulfostearic acid, α-sulfo-α-methylpalmitic acid, α-sulfo-α-methylstearic acid, α-sulfobehenic acid, α-sulfoarachidic acid, α-sulfolignoceric acid and mixtures thereof.

7. Solid polymers of vinyl chloride having improved heat-stabilizability with barium-cadmium stabilizers, prepared by emulsifying vinyl chloride monomer with monosodium salts of α-sulfo-fatty acids having 12 to 24 carbon atoms and a concentration of 0.6 to 4.0 percent by weight based on said monomer to produce a dispersion, performing the polymerization at a pH of 2 to 5 to produce polymers, mixing said dispersion with 0.1 to 0.8 percent by weight of alkaline agent based on said polymers, said alkaline agent selected from the group consisting of alkali carbonates and alkali hydroxides, and drying said dispersion by atomization to produce said solid polymers.

8. The product of claim 7, wherein said alkaline agents are 0.4 to 0.5 percent by weight.

9. The product of claim 7, wherein said monosodium salts of α-sulfo-fatty acids are 0.8 to 3.0 percent by weight and have 12 to 18 carbon atoms.

10. The product of claim 8, wherein said monosodium salts of α-sulfo-fatty acids are 0.8 to 3.0 percent by weight and have 12 to 18 carbon atoms.

11. The product of claim 7, wherein said α-sulfo-fatty acids are selected from the group consisting of α-sulfolauric acid, α-sulfomyristic acid, α-sulfopalmitic acid, α-sulfostearic acid, α-sulfo-α-methylpalmitic acid, α-sulfo-α-methylstearic acid, α-sulfobehenic acid, α-sulfoarachidic acid, α-sulfolignoceric acid and mixtures thereof.

References Cited
UNITED STATES PATENTS

| | | | |
|---|---|---|---|
| 3,627,717 | 12/1971 | Kuhnen | 260—23 XA |
| 2,140,048 | 12/1938 | Fikentscher et al. | 260—2 |
| 3,057,831 | 10/1962 | Holdsworth | 260—78.5 |
| 3,208,965 | 9/1965 | Kühne | 206—30.6 |

MAURICE J. WELSH, Primary Examiner

H. S. COCKERAM, Assistant Examiner

U.S. Cl. X.R.

260—23 XA, 23 R, 29.6 PT, 29.6 Z, 29.7 R, 29.7 SR, 29.7 PT, 45.7 R, 45.75 U, 45.75 K, 45.75 R, 45.85, 45.9 R, 45.95